United States Patent [19]

Ito et al.

[11] 3,999,167

[45] Dec. 21, 1976

[54] METHOD AND APPARATUS FOR GENERATING CHARACTER PATTERNS

[75] Inventors: Masamichi Ito; Takashi Hirasaki; Hiroshi Sato, all of Ebina, Japan

[73] Assignee: Fuji Xerox Co., Ltd., Tokyo, Japan

[22] Filed: Nov. 1, 1974

[21] Appl. No.: 520,220

[30] Foreign Application Priority Data

Nov. 5, 1973 Japan .............................. 48-123382

[52] U.S. Cl. ......................... 340/172.5; 340/324 M; 340/166 R

[51] Int. Cl.[2] ..................... G06F 3/00; G08B 23/00; H04Q 1/00

[58] Field of Search ............. 340/146.3 MA, 172.5, 340/324 AD, 324 M; 178/DIG. 3

[56] References Cited

UNITED STATES PATENTS

| | | | |
|---|---|---|---|
| 3,769,451 | 10/1973 | Connor | 178/DIG. 3 |
| 3,786,478 | 1/1974 | King, Jr. | 178/DIG. 3 |
| 3,789,386 | 1/1974 | Itoh | 178/DIG. 3 |
| 3,824,590 | 7/1974 | Limb | 178/DIG. 3 |
| 3,873,761 | 3/1975 | Bigelow et al. | 178/DIG. 3 |
| 3,878,536 | 4/1975 | Gilliam | 340/324 AD |

OTHER PUBLICATIONS

Ii, L. B., "Video Data Compaction", IBM Technical Disclosure Bulletin, vol. 14, No. 10, Mar. 1972, pp. 3095–3098.

*Primary Examiner*—Raulfe B. Zache
*Attorney, Agent, or Firm*—Gerald J. Ferguson, Jr.; Joseph J. Baker

[57] ABSTRACT

Apparatus for generating a character pattern where the character pattern comprises a plurality of dots where certain ones of the dots fall within the character outline and others of the dots fall outside of the character outline, the apparatus comprising first storing means for storing preselected ones of the dots; decoder means responsive to at least some of the stored dots for reconstructing the dots not stored in the first storing means; pattern combining means responsive to the stored dots and the reconstructed dots for generating the character pattern therefrom whereby the memory capacity of the first storing means is lessened by having to store therein only the preselected ones of the dots; second storing means for storing the reconstructed dots; and the decoder means being further responsive to reconstructed dots previously stored in the second storing means for effecting the reconstruction of the dots not stored in the first storing means.

16 Claims, 8 Drawing Figures

METHOD AND APPARATUS FOR GENERATING CHARACTER PATTERNS

BACKGROUND OF THE INVENTION

1. Field of the Invention

This invention relates to character generators and in particular to such generators utilizing minimal memory capacity.

2. Discussion of the Prior Art

Heretofore certain known character generators have generated characters by utilizing a memory where the dot pattern of each character of the character set is stored in a memory. Thus, referring to FIG. 2, all dots comprising the 15 × 15 matrix would be stored for the illustrated character. In other words, a total of 225 memory cells would have to be allocated for the storage of the character. With a corresponding memory allocation for each of the other characters of any given set, it can be appreciated that the memory capacity can be quickly used up by a set of many characters and, in particular, when the characters are of a complicated configuration such as the characters of the Chinese alphabet, a typical Chinese character being shown in FIG. 5. Hence, the character generators of the prior art are inadequate in so far as memory utilization is concerned when generating the characters of a large set where the characters tend to be of complicated configuration.

SUMMARY OF THE INVENTION

Thus, it is a primary object of this invention to provide an improved method and apparatus for generating a character where less memory space is required than with the prior art system described above.

This and other objects of the invention will become apparent upon a reading of the specification and claims taken with the drawing.

DETAILED DESCRIPTION OF A PREFERRED EMBODIMENT

Figure 3:
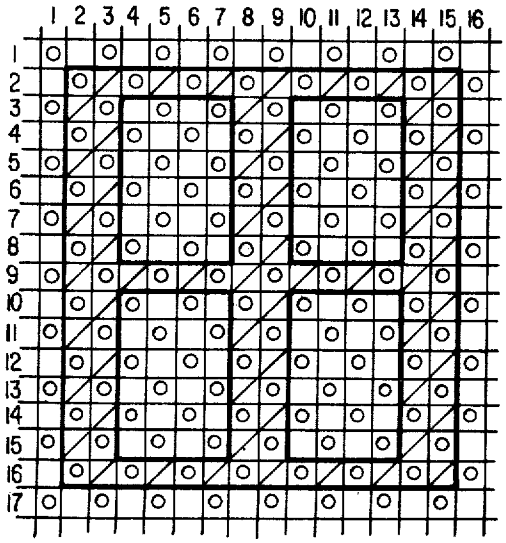
Figure 4:
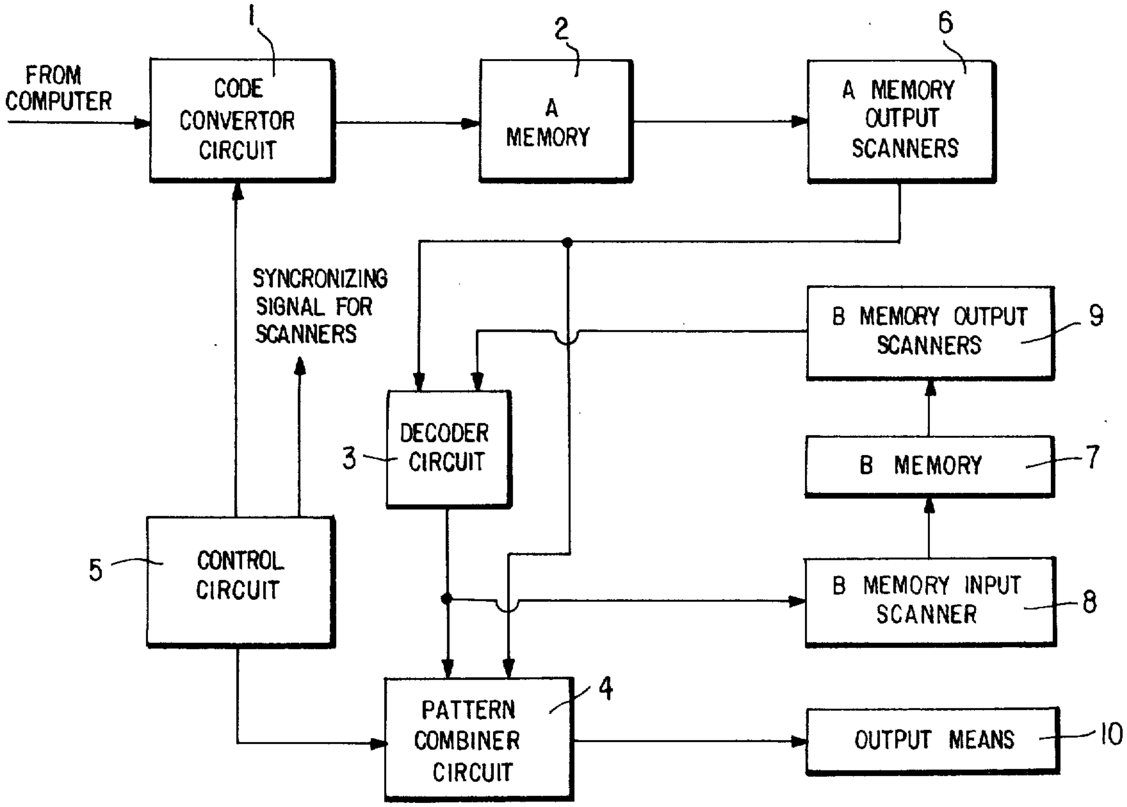
FIG. 4 is a block diagram of an illustrative character generator in accordance with the invention.

Referring to the drawing where like reference numerals refer to like elements, and in particular, to FIG. 4, there is shown a code converter circuit 1 which may be connected to an external source such as a general purpose digital computer or the like. The computer output may apply to code converter circuit 1 a code corresponding to the character to be generated. Code converter circuit 1 converts the code applied thereto to an address in A memory 2 where information corresponding to the character to be generated is stored. A code converter which may be used is described in "Pulse and Digital Circuits," by Millman and Taub, McGraw-Hill Book Company, Inc., New York, New York, 1956, page 424. If the character of FIG. 3, for example, were stored in A memory 2, only ½ of the 272 bits or dots comprising the 17 × 16 matrix of the FIG. 3 character need be stored in memory 2 at the address decoded by convertor 1. The stored dots are indicated by the presence of circles in the matrix of FIG. 3. In accordance with the invention, the remainder of the character is reconstructed from the stored dots. In FIG. 3, the presence of a non-stored dot within the character outline is indicated by a slanted line. Non-stored dots outside the character outline are indicated by blank spaces within the matrix. Memory allocation is thus decreased by a factor of 2 since only every other dot of the original character matrix is stored. This results in a significant decrease of necessary memory for many character sets such as the set of Chinese characters. If desired, further decrease in memory allocation can be effected by storing every third or every nth dot of the original character matrix to thereby respectively achieve a threefold or an n-fold decrease in memory utilization.

The information stored for the selected character is applied to a decoder circuit 3 and a pattern combiner circuit 4 via A memory output scanners 6, such as shown in U.S. Pat. No. 3,362,015, although any other means may be employed to apply the character information to decoder circuit 3 and pattern combiner 4. The purpose of decoder circuit 3 is to reconstruct the non-stored dots of the original character matrix. Pattern combiner circuit 4 then utilizes the dots originally stored in A memory 2 and the reconstructed dots provided by decoder circuit 3 to provide at its output the complete characer pattern. This pattern may be applied to output means 10 such as a display device, a printer, and/or a recorder.

The decoder 3 may utilize not only the information stored in A memory 2 but also dots previously reconstructed in implementing the reconstruction of subsequent dots of the original character matrix. Thus, as dots are reconstructed, they may also be applied to B memory 7 via a B memory input scanner 8 such as described in the above mentioned U.S. Pat. No. 3,362,015. The reconstructed dots may then subsequently be applied to decoder circuit 3 via B memory output scanners 9.

Figure 7:
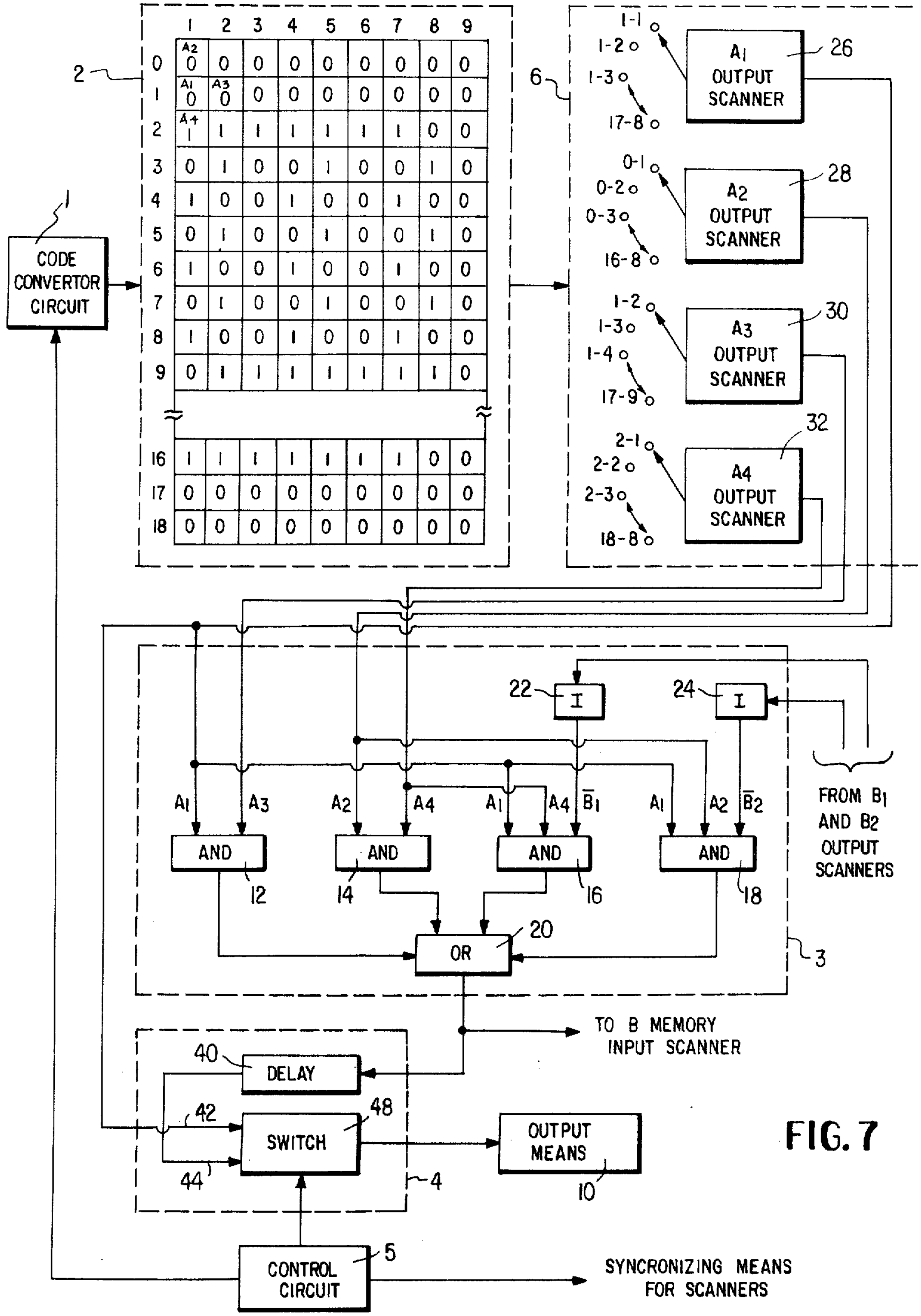
FIG. 7 is a more detailed block diagram of a portion of the block diagram of FIG. 4.
Figure 8:
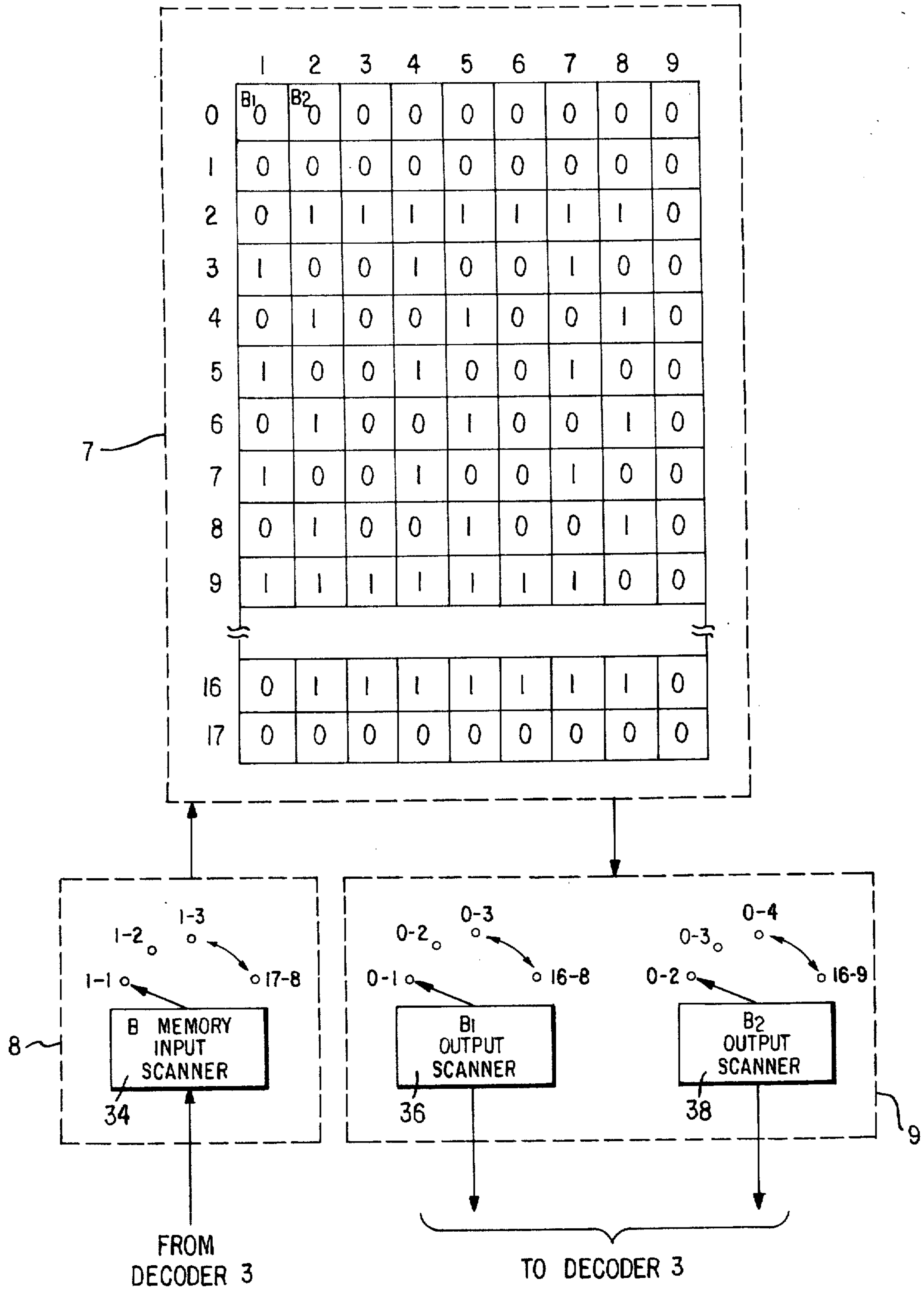
FIG. 8 is a more detailed diagram of a further portion of the block diagram of FIG. 4.

Reference should now be made to FIGS. 7 and 8 which illustrate in further detail the block diagram of FIG. 4 where blocks 2, 3, 4, 6, 7, 8, and 9 of FIG. 4 are shown in dotted lines in FIGS. 7 and 8. Thus, in FIG. 7, the location within memory 2 specified by converter 1 is illustrated by a 19 × 9 matrix, which is shown within dotted line block 2. Rows 1 – 18 and Columns 1 – 8 of the matrix contain the stored dots of the original character pattern of FIG. 3. Row 0 and certain spaces in Column 9 may have ZERO's prestored therein for reasons which will be explained in more detail hereinafter. Cell 2 – 1 (the cell of the second row, first column) of the memory 2 matrix contains a ONE, which corresponds, in the FIG. 3 matrix, to the first stored dot in the second row of the matrix. As can be seen the first stored dot in the second row of the FIG. 3 matrix falls within the character outline and occurs at row 2, column 2 of the matrix. Since this latter dot is within the character outline, it is assigned a value of ONE and thus this is the value stored in cell 2–1 of the memory 2 matrix. Since every other dot of the FIG. 3 character matrix is stored in the memory 2 matrix, it can be seen that the number of columns in the memory 2 matrix is substantially ½ that of the FIG. 3 matrix and thus a substantial reduction in memory capacity has been effected. It should be noted that although the memory location shown in memory 2 is in matrix form, this is for purpose of illustration only and the selected location in memory 2 may also be in linear or any other form as long as all of the information stored in the memory 2 matrix is provided.

Figure 1:
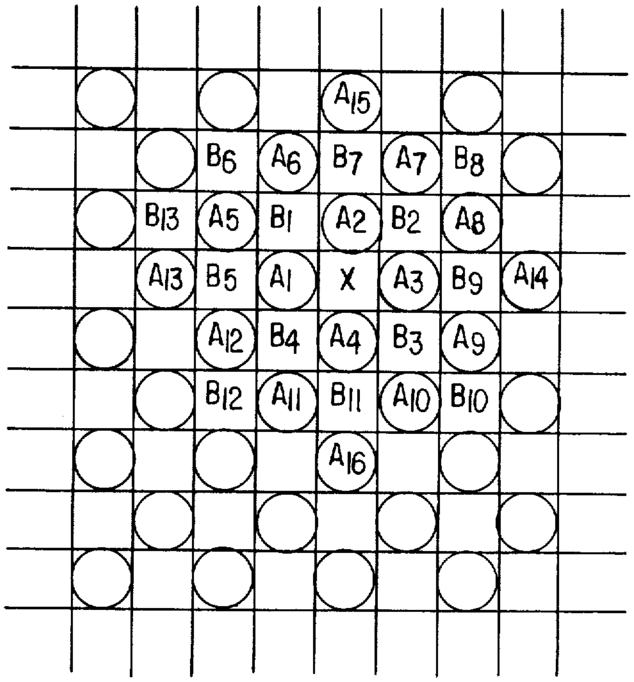
FIG. 1 is a matrix illustrating a character decoding method used in the subject invention.

In order to reconstruct the original character from the information stored in the memory 2 matrix, decoder 3 must be utilized. To better understand the operation of decoder 3, reference should first be made to FIG. 1. FIG. 1 corresponds, for example, to a portion of the FIG. 2 or FIG. 3 character matrices. The cell X corresponds to the cell whose value is currently being determined. This value may either be ONE if the cell falls within the outline of the character outline or ZERO if it falls outside of this outline. In order to determine what the value of the cell X should be, the values of the surrounding cells are processed by decoder 3. In FIG. 1 the cells containing circles correspond to the stored dots of the original pattern and the values of these cells are designated $A_1, A_2, A_3 \ldots A_i \ldots A_n$ where $n$ = the number of stored dots which are utilized to find a suitable value for X. $A_1$ is the value of the stored dot to the immediate left of the cell under consideration. $A_2$-$A_4$ proceed clockwise around this cell while $A_5$-$A_{16}$ are the values of the stored dots shown in FIG. 1. If the values of previously determined dots are to be used in determining the value of cell X, the values of the previously determined cells are designated $B_1, B_2, B_3 \ldots B_j \ldots B_m$ where $m$ = the number of dots whose values have already been determined. The logical equation for determining the value of cell X may be generally represented by $$X = F(A_i, B_j) \qquad (I)$$

Figure 2:
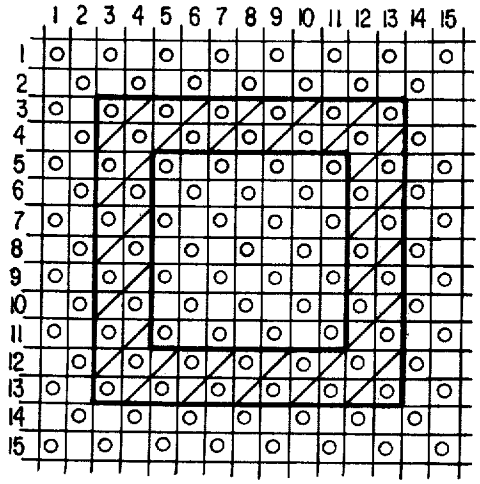
FIGS. 2 and 3 are matrices illustrating a storage compaction method used in the subject invention for illustrative characters.

Referring now to FIG. 2 the value X of each non-stored cell is determined by the following logical equation:

$$X = A_1 . A_2(A_3+A_4)+A_3.A_4(A_1+A_2) \qquad II$$

Further, the equation for X for reproducing the character pattern of FIG. 3 is as follows:

$$X = A_1.A_3+A_2.A_4+A_1.A_4.B_1+A_1.A_2.B_2 \qquad III$$

or $$X = A_1.A_3+A_2.A_4+A_1.A_4.A_{11}+A_1.A_2.A_6 \qquad IV.$$

It should be noted with respect to equations (III) and (IV) that in equation (III), X is determined utilizing not only the original values stored in memory matrix 2 (that is, the A values) but also the values of previously determined nonstored cells (that is, the B values), while in equation (IV) only the A values are used. Thus, more than one logical equation may be implemented by decoder circuit 3 depending upon which overall arrangement is the most efficient and economical. By statistically determining the continuity of the patterns, it is possible to obtain logical equations for many types of character patterns, including the complicated, entire set of Chinese characters. An example of a logical equation for determining and generating a typical complex Chinese character such as shown in FIG. 5 is as follows:

$$X = A_1.A_2.(A_3+A_4)+A_3.A_4.(A_1+A_2) + A_1.[A_2.(A_{12}. +A_6.A_9+A_8.A_{14}+A_5.A_{15}+A_8.A_{15}) + A_3.(A_9+A_{15}. +A_{12}.A_{13}+A_6.A_{12}+A_8.A_{10}+A_5.A_8) + A_4.(A_{12}+A_6. .A_{11}+A_9.A_{11})] + A_3.[A_2.A_8.(A_5.A_7.A_{14}+A_5.A_{15}. +A_7.A_{15}) + A_4.(A_9.A_{12}+A_8.A_{15})] \qquad (V)$$

Figure 5:
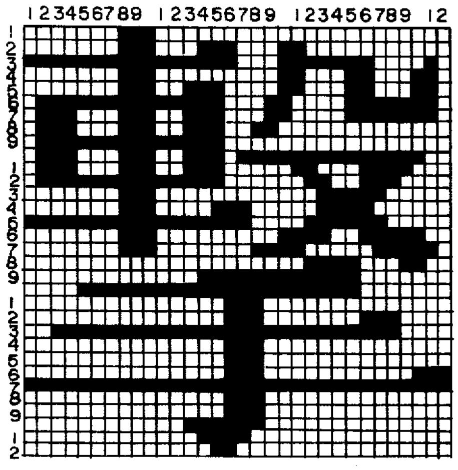
FIG. 5 is a matrix illustrating a Chinese character to be generated.
Figure 6:
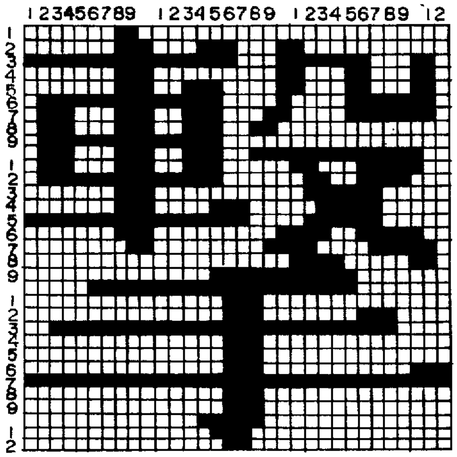
FIG. 6 is a matrix illustrating how the character of FIG. 5 might be displayed or printed in accordance with the invention.

Although the above logical equation will not exactly reproduce the FIG. 5 character, it will generate the character of FIG. 6, which, as can be appreciated, quite closely corresponds to the character of FIG. 5.

Returning now to FIGS. 7 and 8, the decoder 3 of FIG. 7, contains the logic circuitry necessary for implementing the logical equation (III). In particular there is provided an AND circuit 12 for developing the $A_1.A_3$ term of equation (III). AND circuits 14 – 18 develop the remaining terms of the equation. OR circuit 20 is responsive to the outputs of all of the AND circuits to develop the X value. Inverters 22 and 24 respectively develop the $B_1$ and $B_2$ values.

The $A_1$ values are applied from the memory 2 matrix through an $A_1$ output scanner 26 to AND circuits 12, 16 and 18 a switch 48 in pattern combiner 4, which will be described in more detail hereinafter. The $A_1$ output scanner is initially connected to cell 1—1 of the memory 2 matrix, as indicated in FIG. 7. The scanner arm then sequentially connects cells 1-2, 1-3 through 17–8 to AND circuits 12, 16 and 18 and switch 48. Scanner 26 may be of any conventional mechanical or electrical type. $A_2$ output scanner 28, $A_3$ output scanner 30 and $A_4$ output scanner 32 are similar to scanner 26; however, their initial and terminal scanning positions are different from that of scanner 26. Thus, the cell 1—1 of the memory 2 matrix has designated therein $A_1$ which indicates that the initial position of scanner 26 is such that the scanning arm thereof is connected to cell 1—1. In a similar manner cell 0–1 is connected to scanner 28, cell 1-2 is connected to scanner 30 and cell 2–1 is initially connected to scanner 32. Note that row 0 has all ZERO's prestored therein so the value of $A_2$ must necessarily be ZERO for all X cells in the first fow. That is, since $A_2$ is above the X cell, there can be no ONE values of $A_2$ when the values of the non-stored dots in the first row are being determined by decoder 3. During this initial position of the scanners, the X value of cell 1-2 of the FIG. 3 matrix is being determined. As can be seen this value is ZERO and the manner by which decoder circuit 3 determines such values will be described in further detail hereinafter. After the value of non-stored dot 1-2 of FIG. 3 is determined, the value of cell 1-4 of the FIG. 3 matrix is determined. This is effected by stepping scanners 26–32 to their next positions. Thus, scanner 26 moves to cell 1-2 of the memory 2 matrix, scanner 28 moves to cell 0–2, scanner 30 moves to cell 1-3 and scanner 32 moves to cell 2—2: In this manner the values of the cells of the memory 2 matrix are sequentially applied to decoder 3 and pattern combiner 4 until the entire matrix has been processed. It should be noted that the 9th column of the memory 2 matrix is also stored with all ZERO's so the value of $A_3$ is ZERO when the rightmost non-stored dot of each row of the FIG. 3 matrix is being processed.

If only stored values of the original character are utilized in reconstructing the non-stored values, essentially only the circuitry of FIG. 7 is required to generate the desired characters. However, if the values of previously determined dots are also utilized, as is the case in equation (III), the B memory 7 and its associated scanners 8 and 9 must also be utilized. Thus, referring to FIG. 8, there is shown B memory 7. It should be noted that the matrix of memory 7 comprises the entire memory thereof. This, as stated before, does not apply to the matrix of memory 2; rather, the matrix of memory 2 corresponds to a predetermined portion thereof, the address of which is specified by the output of code converter 1. As can be seen in FIG. 1, $B_1$ and $B_2$ are in the row above the X cell, whose value is being determined. Thus, as each of the non-stored dots of row 1 of the FIG. 3 matrix are being processed, the values of $B_1$ and $B_2$ must necessarily be ZERO and thus row 0 of memory 7 has been preset to zero. The value determined for cell 1-2 of FIG. 3 is stored via B memory input scanner 34 into cell 1—1 of B memory 7. As can be seen in FIG. 3 the value of cell 1-2 is ZERO and as can be seen in FIG. 8, cell 1—1, to which scanner 34 is initially set, has stored therein a ZERO. It can be further seen that a $B_1$ output scanner 36 is initially connected to cell 0–1 and a $B_2$ output scanner 38 is initially connected to cell 0–2 of B memory 7. Thus, the scanners 36 and 38 are connected one row above the row to which scanner 34 is connected. The output of scanners 36 and 38 are respectively connected to inverters 22 and 24 of decoder circuit 3. Thus, it can be seen that the B values applied to memory 7 via scanner 34 are based on previously determined B values since scanners 36 and 38 are connected to the row above scanner 34. The initial and terminal cell locations for scanners 34 – 38 are indicated on FIG. 8. It should be noted, as was the case for the memory 2 matrix, that memory 7 is shown for purpose of illustration as a matrix but may be arranged otherwise if desired. It should also be noted that in the 9th column of the memory 7 matrix, the B values are all ZERO as can be appreciated from an inspection of columns 15 and 16 of FIG. 3. Also the rows and cells used to store the pre-stored values may be dispensed with, if desired, and replaced with appropriate logic circuitry which would sence that the top row, for example, is being processed and generate appropriate ZERO values for the $A_2$, $B_1$ or $B_2$ values.

In order to further illustrate the operation of decoder 3, the determination of the value of cell 2–15 of FIG. 3 will be described. It should be noted that the value of this non-stored cell is ONE. At this time, the value of $A_1$ is ONE and $A_3$ is ZERO as can be seen in FIG. 3; thus, the output of AND circuit 12 will be ZERO. The value of $A_2$ is ZERO and $A_4$. is ONE; thus, the output of AND circuit 14 will be ZERO. Referring to AND circuit 16, $A_1$ is ONE, $A_4$ is ONE and $B_1$ is also ONE and thus the output of this AND circuit is ONE and hence a ONE signal is generated at the output of OR circuit 20 to indicate that the value of cell 2–15 is ONE.

The output from OR circuit 20 is applied to a delay circuit 40 of pattern combiner 4. As stated above, the purpose of pattern combiner 4 is to combine the dots previously stored in memory 2 with the dots reconstructed by decoder 3 so that a complete character may be generated for utilization by output means 10. This is effected by switch 48, which may be of the single pole, double throw type, and delay circuit 40. Switch 48 and delay 40 may be implemented by any well known means. Switch 48 operates under the control of control circuit 5 as do scanners 26 – 38. All scanners and switch 48 are operated at the same speed. Thus, scanner 26 first connects cell 1—1 (which corresponds to cell 1—1 of FIG. 3) of the memory 2 matrix to input terminal 42 of switch 48. At this time the switch is connected to terminal 42 to apply the value of this cell to output means 10. Next, the output of decoder 3 is applied to terminal 44 via delay 40, the delay being such that the output pulses from decoder 3 fall half way between the $A_1$ pulses applied to terminal 42. Thus the reconstructed pulses are intermixed and combined with the previously stored A pulses. When an output pulse appears at delay 40, switch 48 is connected to terminal 44 so that the reconstructed pulse can next be applied to output means 10. As stated before, the reconstructed output pulses are also stored in B memory 7 beginning at cell 1—1 thereof. In the foregoing manner, the switch 48 switches back and forth between memory 2 and decoder 3 to reconstruct the complete character and generate it for output means 10.

Thus there can now be seen that an improved method and apparatus for charcter pattern generation has been described wherein dots are selectively extracted from the dot pattern comprising a character to be generated and the extracted dots are stored in a memory 2. The original character is generated by combining the previously stored dot information from memory 2 with the values of the non-stored dots which are determined from the dots surrounding each non-stored dot to be reconstructed. The surrounding dots may either be the dots stored in memory 2 or they may be previously determined dots. With this method and apparatus, character patterns can be easily generated with substantially reduced memory capacity, even the character patterns of such sets as the set of Chinese characters, which is quite large and quite varied.

What is claimed is:

1. Apparatus for reconstructing an original character pattern comprising an original matrix of $m \times n$ dots from a compressed character pattern comprising approximately $(m \times n)/2$ dots; said apparatus comprising
   first memory means for storing said compressed character pattern as a compressed matrix of approximately $(m \times n)/2$ dots where each row of the compressed character pattern so contains every other dot of the corresponding row of the original character pattern that for each omitted dot of the original character pattern, the following dots of the original character pattern are stored in the first memory means: (a) a left dot disposed to the immediate left of each said omitted dot, (b) a right dot disposed to the immediate right of each said omitted dot, (c) an upper dot disposed immediately above each said omitted dot and (d) a lower dot disposed immediately below each said omitted dot;
   decoder means responsive to said first memory means for restoring each said omitted dot to the original character pattern, said decoder means being responsive to the presence or absence of said left, right, upper and lower dots and at least one further dot in addition to said last-mentioned dots to generate a restored dot for each said omitted dot; and
   combining means for combining the dots stored in said first memory means with said restored dots to thereby effect the reconstruction of said original character pattern.

2. Apparatus as in claim 1 where said further dot is stored in said first memory.

3. Apparatus as in claim 2 where said decoder means is responsive to a plurality of said further dots including said left, right, upper and lower dots.

4. Apparatus as in claim 3 where at least one of said further dots is diagonally disposed in said original matrix with respect to one of said left, right, upper and lower dots and immediately adjacent thereto.

5. Apparatus as in claim 4 where at least one of said further dots is collinearly disposed with respect to one of said left, right, upper and lower dots and said omitted dot.

6. Apparatus as in claim 1 including a second memory responsive to said decoder means for storing said restored dots and where said further dot is one of the restored dots stored in said second memory.

7. Apparatus for reconstructing an original character pattern comprising an original matrix of $m \times n$ dots from a compressed character pattern comprising approximately $(m \times n)/2$ dots; said apparatus comprising first memory means for storing said compressed character pattern as a compressed matrix of approximately $(m \times n)/2$ dots where each row of the compressed character pattern so contains every other dot of the corresponding row of the original character pattern that for each omitted dot of the original character pattern, the following dots of the original character pattern are stored in the first memory means: (*a*) a left dot $A_1$ disposed to the immediate left of each said omitted dot, (*b*) a right dot $A_3$ disposed to the immediate right of each said omitted dot, (c) an upper dot $A_2$ disposed immediately above each said omitted dot, (d) a lower dot $A_4$ disposed immediately below each said omitted dot, (e) a dot $A_5$ diagonally disposed immediately to the left and above dot $A_1$, (f) a dot $A_6$ diagonally disposed immediately to the left and above dot $A_2$, (g) a dot $A_7$ diagonally disposed immediately to the right and above dot $A_2$, (h) a dot $A_8$ diagonally disposed immediately to the right and above dot $A_3$, (i) a dot $A_9$ diagonally disposed immediately to the right and below dot $A_3$, (j) a dot $A_{10}$ diagonally disposed immediately to the right and below dot $A_4$, (k) a dot $A_{11}$ diagonally disposed immediately to the left and below dot $A_4$, (l) a dot $A_{12}$ diagonally disposed immediately to the left and below dot $A_1$, (m) a dot $A_{13}$ collinearly disposed to the left of dot $A_1$ and said omitted dot, (n) a dot $A_{14}$ collinearly disposed to the right of dot $A_3$ and said omitted dot, (o) a dot $A_{15}$ collinearly disposed above dot $A_2$ and said omitted dot;

decoder means responsive to said first memory means for restoring each said omitted dot to the original character pattern, said decoder means being responsive to said dots $A_1$ through $A_{15}$ to generate a restored dot for each said omitted dot; and combining means for combining the dots stored in said first memory means with said restored dots to thereby effect the reconstruction of said original character pattern.

8. Apparatus as in claim 7 where said decoder means restores each said omitted dot X in accordance with the following equation:

$$X = A_1 \cdot A_2 \cdot (A_3 + A_4) + A_3 \cdot A_4 \cdot (A_1 + A_2) + A_1 \cdot [A_2 \cdot (A_{12} \cdot + A_6 \cdot A_9 + A_8 \cdot A_{14} + A_5 \cdot A_{15} + A_8 \cdot A_{15}) + A_3 \cdot (A_9 + A_{15} \cdot + A_{12} \cdot A_{13} + A_6 \cdot A_{12} + A_8 \cdot A_{10} + A_5 \cdot A_8) + A_4 \cdot (A_{12} + A_6 \cdot A_{11} + A_9 \cdot A_{11})] + A_3 \cdot [A_2 \cdot A_8 \cdot (A_5 \cdot A_7 \cdot A_{14} + A_5 \cdot A_{15} \cdot + A_7 \cdot A_{15}) + A_4 \cdot (A_9 \cdot A_{12} + A_8 \cdot A_{15})]$$

9. A method for reconstructing an original character pattern comprising an original matrix of $m \times n$ dots from a compressed character pattern comprising approximately $(m \times n)/2$ dots; said method comprising the steps of storing in a first memory means said compressed character pattern as a compressed matrix of approximately $(m \times n)/2$ dots where each row of the compressed character pattern so contains every other dot of the corresponding row of the original character pattern that for each omitted dot of the original character pattern, the following dots of the original character pattern are stored in the first memory means: (a) a left dot disposed to the immediate left of each said omitted dot, (b) a right dot disposed to the immediate right of each said omitted dot, (c) an upper dot disposed immediately above each said omitted dot and (d) a lower dot disposed immediately below each said omitted dot;

restoring with a decoder means responsive to said first memory means each said omitted dot to the original character pattern, said decoder means being response to the presence or absence of said left, right, upper and lower dots and at least one further dot in addition to said last-mentioned dots to generate a restored dot for each said omitted dot; and combining the dots stored in said first memory means with said restored dots to thereby effect the reconstruction of said original character pattern.

10. A method as in claim 9 where said further dot is stored in said first memory.

11. A method as in claim 10 where said decoder means is responsive to a plurality of said further dots including said left, right, upper and lower dots.

12. A method as in claim 11 where at least one of said further dots is diagonally disposed in said original matrix with respect to one of said left, right, upper and lower dots and immediately adjacent thereto excluding omitted dots.

13. A method as in claim 11 where at least one of said further dots is collinearly disposed with respect to one of said left, right, upper and lower dots and said omitted dots.

14. A method as in claim 9 including storing said restored dots in a second memory and where said further dot is one of the restored dots stored in said second memory.

15. A method for reconstructing an original character pattern comprising an original matrix of $m \times n$ dots from a compressed character pattern comprising approximately $(m \times n)/2$ dots; said method comprising the steps of storing in a first memory means said compressed character pattern as a compressed matrix of approximately $(m \times n)/2$ dots where each row of the compressed character pattern so contains every other dot of the corresponding row of the original character pattern that for each omitted dot of the original character pattern, the following dots of the original character pattern are stored in the first memory means: (a) a left dot $A_1$ disposed to the immediate left of each said omitted dot, (b) a right dot $A_3$ disposed to the immediate right of each said omitted dot, (c) an upper dot $A_2$ disposed immediately above each said omitted dot, (d) a lower dot $A_4$ disposed immediately below each said omitted dot, (e) a dot $A_5$ diagonally disposed immediately to the left and above dot $A_1$, (f) a dot $A_6$ diagonally disposed immediately to the left and above dot $A_2$, (g) a dot $A_7$ diagonally disposed immediately to the right and above dot $A_2$, (h) a dot $A_8$ diagonally disposed immediately to the right and above dot $A_3$, (i) a dot $A_9$ diagonally disposed immediately to the right and below dot $A_3$, (j) a dot $A_{10}$ diagonally disposed immediately to the right and below dot $A_4$, (k) a dot $A_{11}$ diagonally disposed immediately to the left and below dot $A_4$, (l) a dot $A_{12}$ diagonally disposed immediately to the left and below dot $A_1$, (m) a dot $A_{13}$ collinearly disposed to the left of dot $A_1$ and said omitted dot, (n) a dot $A_{14}$ collinearly disposed to the right of dot $A_3$ and said omitted dot, (o) a dot $A_{15}$ collinearly disposed above dot $A_2$ and said omitted dot;

restoring with a decoder means responsive to said first memory means each said omitted dot to the original character pattern, said decoder means being responsive to said dots $A_1$ through $A_{15}$ to generate a restored dot for each said omitted dot; and combining the dots stored in said first memory means with said restored dots to thereby effect the reconstruction of said original character pattern.

16. A method as in claim 15 where each said omitted dot X is restored in accordance with the following equation:

$$X = A_1 \cdot A_2 \cdot (A_3+A_4)+A_3 \cdot A_4 \cdot (A_1+A_2) + A_1 \cdot [A_2 \cdot (A_{13} \cdot +A_6 \cdot A_9+A_8 \cdot A_{14}+A_5 \cdot A_{15}+A_8 \cdot A_{15}) + A_3 \cdot (A_9+A_{15} \cdot +A_{12} \cdot A_{13}+A_6 \cdot A_{12}+A_8 \cdot A_{10}+A_5 \cdot A_8) + A_4 \cdot (A_{12}+A_6 \cdot A_{11}+A_9 \cdot A_{11})] + A_3 \cdot [A_2 \cdot A_8 \cdot (A_5 \cdot A_7 \cdot A_{14}+A_5 \cdot A_{15} \cdot +A_7 \cdot A_{15}) + A_4 \cdot (A_9 \cdot A_{12}+A_8 \cdot A_{15})]$$

* * * * *